April 23, 1946.　　　W. L. BELL　　　2,398,915
SURGICAL INSTRUMENT
Filed July 6, 1945
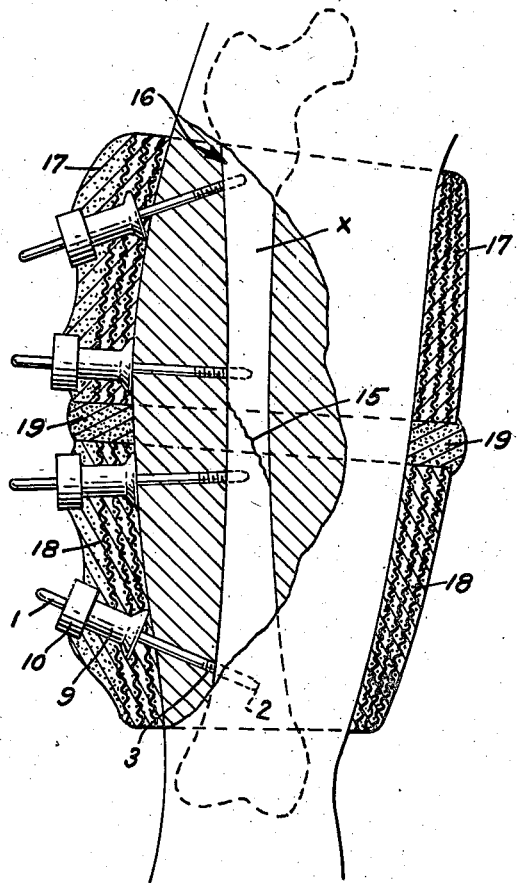
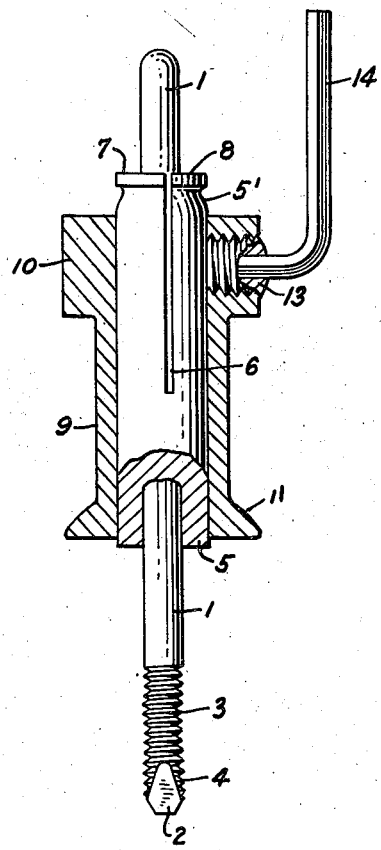
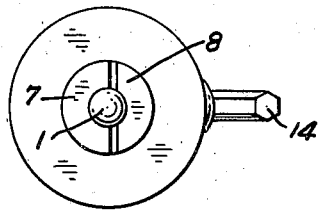
INVENTOR.
WILLIAM L. BELL
BY
ATTORNEY.

Patented Apr. 23, 1946

2,398,915

UNITED STATES PATENT OFFICE 2,398,915

SURGICAL INSTRUMENT

William L. Bell, Oakland, Calif.

Application July 6, 1945, Serial No. 603,428

1 Claim. (Cl. 128—92)

This invention relates to surgical instruments and more particularly to screw pins for bone surgery, and the method of reducing bone fractures. Reference is here made to my preceding application Serial No. 419,561, filed November 18, 1941, for Surgical instruments.

Among the objects of the invention is to enable skeletal immobilization without opening the tissues at the zone of fracture.

Another object is the provision of means to hold the immobilization screw pins against movement in the plaster casings.

Another object is to enable the easy removal of the pins without disturbing the plaster casings.

Another object is to enable rapid and accurate setting of fractured bones and their subsequent maintenance of position.

Another object is the provision of means for reducing bone fractures without leaving any foreign body within the bone or surrounding tissue.

Another object is the provision of simple means for enabling the setting of bones in field operations by manual reductions; thus saving much shock and transportation trauma.

A further object is the prevention of lateral, rational and gliding movements of fractured fragments.

Other objects and advantages will appear as the description progresses.

In this specification and the accompanying drawing the invention is disclosed in its preferred form. But it is to be understood that it is not limited to this form; because it may be embodied in modifications within the spirit of the invention as defined in the claim following the description.

In the one sheet of drawings:

Fig. 1 is a front elevation of a human thigh partially in longitudinal section disclosing the femur having this invention applied thereto.

Fig. 2 is a front elevation of a screw pin, chuck and sheath constructed in accordance with this invention, In detail the construction illustrated in Fig. 1, comprises the straight pin 1, preferably of stainless steel, flattened to a sharp wedge shape 2 at one end. This end of the pin is threaded at 3 for a suitable distance, about one-half inch. Cutting away to flatten the end of the pin provides in effect a tap at 4 for cutting its own thread when it is rotated into the cortex of the bone.

This pin extends through the tubular chuck 5 and is freely slidable therein. This chuck is also preferably composed of stainless steel, and is provided with the lateral slot 6 extending from its outer end, well into the body of the chuck and forming the jaws 7, 8.

This chuck is a sliding fit within the sheath 9, having the annular head 10, and the annular base flange 11. This sheath is preferably composed of a suitable aluminum alloy.

The head of the sheath is provided with the safety setscrew 13 laterally threaded therein and bearing against the jaw 8 to clamp the chuck jaws against the pin 1 to adjustably fix it within the clutch 5 and sheath 9. This setscrew has a hexagonal socket to receive the key 14.

The chuck 5 could be omitted from the structure and the sheath 9 attached directly to the pin 1, by the setscrew 13, if desired. But the assembly shown is more convenient, both in operative and post operative manipulation.

This invention operates substantially as follows:

A fractured femur $x$, as shown in Fig. 1, has been chosen for illustration; but the reduction of any fracture in the human skeletal structure will be apparent to those skilled in the art in applying this invention.

The first step in the technique is to locate the fracture at 15 by fluoroscopic examination. Then proceed in the usual manner to drill two or more pilot holes in the bone $x$ on opposite sides of the fracture. The next step is to choose four sterilized pins 1, of the proper length to project well beyond the fleshy tissue 16, and screw these pins into their respective drill holes in the bone by manually rotating the sheath 9, or by the use of a hand brace. The pilot drill holes should be slightly smaller than the diameter of the pins so that their threaded ends 4 will tap their way into the bone and make rigid connection therewith.

It is preferable that the pins not be in exact alinement with each other. The several sterilized chucks 5 are then placed over the projecting ends of the pins and pushed forward until they contact the protective gauze covering the skin of the patient. The several sterilized sheaths 9 are then placed on the chucks and moved forward into contact with the gauze, and rotated until the setscrews 13 aline with either of the jaws 7, 8. The key 14 is then used to compress the jaws until they firmly grip their respective pins.

The encircling plaster cases, such as 17, 18, are then applied around the limb on opposite sides of the fracture, so that the sheaths 9 are firmly embedded therein. After the plaster cases have set, traction is applied to the limb until the opposite fracture ends are brought into conjunction, as determined by palpation or reexamination by fluoroscope. The separated opposed ends of the plaster cases are then filled with plaster as at 18. The tractive adjustment is maintained until this plaster union 19 sets, which completes the operation. The cases 17, 18 are formed of alternate layers of gauze and plaster of paris or the like, applied to the exterior of the injured limb in the usual manner.

The pins 1, are at all times easily adjustable within their respective chucks and sheaths 5—9 to facilitate accurate conjunction of the fracture, before traction is released.

By this operative technique no open incision is made in the tissue 16, reducing infection to the minimum. Neither is any extraneous apparatus necessary to aline or fix the pins with respect to each other, except the plaster cases 17, 18, and the union 19.

This invention so simplifies the procedure, that fractures can be reduced in the field in military practice, or in emergencies where only manual traction is available.

The post operative procedure is to back off the setscrews and remove the chucks 5 from the pins 1. This leaves the projecting pins surrounded by relatively large holes through the sheaths, so that the pins can be unscrewed from the bone and withdrawn from the tissue 16, leaving only a small puncture easily sterilized and protected. The plaster cast 17—18—19 can then be removed as indicated and the sheath 9 recovered for reuse. To facilitate the removal of the chuck it is provided with the annular groove 5' to receive the jaws of the removal forceps.

The absence of extraneous metallic connections between the several pins prevents electrolysis and disturbing electric currents, common to certain bone surgery apparatus.

The practice of this invention contributes to the patient's comfort by permitting a wide range of movement without disturbing the fracture area. It also permits early standing and mobilization of the whole body for stimulating nutrition and increased flow of blood to the injured parts.

Having thus described this invention and its mode of operation what is claimed and desired to secure by Letters Patent is:

A surgical instrument comprising a bone penetrating pin; a split chuck surrounding said pin; a sheath surrounding said chuck and having a reduced portion between an enlarged head and base; and a set screw in said head adapted to clamp said chuck on said pin.

WILLIAM L. BELL.